United States Patent
Reddy

(10) Patent No.: US 9,608,513 B2
(45) Date of Patent: Mar. 28, 2017

(54) METHODS AND SYSTEMS FOR IMPROVING LOAD TRANSIENT RESPONSE IN LLC CONVERTERS

(71) Applicant: General Electric Company, Schenectady, NY (US)

(72) Inventor: Raghothama Reddy, Plano, TX (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 14/197,529

(22) Filed: Mar. 5, 2014

(65) Prior Publication Data
US 2014/0268905 A1    Sep. 18, 2014

Related U.S. Application Data

(60) Provisional application No. 61/793,907, filed on Mar. 15, 2013.

(51) Int. Cl.
*H02M 3/335* (2006.01)
*H02M 1/42* (2007.01)
*H02M 1/00* (2006.01)

(52) U.S. Cl.
CPC .... *H02M 1/4225* (2013.01); *H02M 2001/007* (2013.01); *H02M 2001/0019* (2013.01); *H02M 2001/0058* (2013.01); *Y02B 70/126* (2013.01); *Y02B 70/1491* (2013.01); *Y02P 80/112* (2015.11)

(58) Field of Classification Search
CPC . H02M 2001/0025; H02M 2007/4815; H02M 3/335; H02M 3/33507; H02M 3/33569; H02M 1/4258; H02M 1/42; Y02B 70/1433; G05F 1/70
USPC .............. 363/21.02, 21.03; 323/205, 207
See application file for complete search history.

(56) References Cited

U.S. PATENT DOCUMENTS

| | | | | |
|---|---|---|---|---|
| 8,054,653 B2* | 11/2011 | Ryu | ........... | H02M 3/33592 363/21.02 |
| 8,097,984 B2* | 1/2012 | Baarman | ........... | H02J 7/025 307/104 |
| 8,232,786 B2 | 7/2012 | Phadke et al. | | |
| 8,259,477 B2 | 9/2012 | Jin et al. | | |
| 9,188,610 B1* | 11/2015 | Edel | ........... | G01R 15/183 |
| 2008/0252280 A1 | 10/2008 | Prodic et al. | | |
| 2009/0129130 A1 | 5/2009 | Young et al. | | |
| 2010/0002469 A1 | 1/2010 | Young et al. | | |
| 2010/0020578 A1* | 1/2010 | Ryu | ........... | H02M 1/4225 363/68 |

(Continued)

OTHER PUBLICATIONS

Hao, "A Sliding-Mode Control Scheme for LLC Resonant DC/DC Converter With Fast Transient Response", IECON 2012—38th Annual Conference on IEEE Industrial Electronics Society, Oct. 25-28, 2012, pp. 162-167.

*Primary Examiner* — Gary L Laxton
(74) *Attorney, Agent, or Firm* — General Electric Company

(57) ABSTRACT

Methods and systems for improving load transient response in LLC converters are provided herein. The method includes coupling a current sensing circuit to an output of the LLC converter, sensing load current of the LLC converter, and increasing a setpoint voltage for a power factor correction (PFC) circuit output based on the sensed load current.

14 Claims, 2 Drawing Sheets

(56) References Cited

U.S. PATENT DOCUMENTS

| | | | |
|---|---|---|---|
| 2011/0211370 A1* | 9/2011 | Luo | H02M 3/33592 363/21.02 |
| 2011/0215776 A1 | 9/2011 | Sheen | |
| 2012/0201061 A1 | 8/2012 | Hampo et al. | |
| 2012/0268093 A1 | 10/2012 | Yamada | |
| 2012/0287684 A1 | 11/2012 | Fahlenkamp | |
| 2014/0368742 A1* | 12/2014 | Joo | H02M 1/4208 348/730 |

* cited by examiner

METHODS AND SYSTEMS FOR IMPROVING LOAD TRANSIENT RESPONSE IN LLC CONVERTERS

CROSS-REFERENCE TO RELATED APPLICATIONS

This application claims the benefit of U.S. Provisional Patent Application No. 61/793,907 filed Mar. 15, 2013, which is hereby incorporated by reference in its entirety.

BACKGROUND

The field of the invention relates generally to inductor-inductor-capacitor (LLC) converters, and more specifically, to improving load transient response using an LLC converter.

Rectifiers that employ a front power factor correction (PFC) circuit and an LLC DC/DC converter adjust the PFC output voltage to increase efficiency of the whole converter system. Efficiency is increased in such systems by operating the LLC converter near its series resonant frequency. During an output load change, the LLC converter quickly adjusts the output voltage, causing its controller to saturate and reach minimum frequency, which is equivalent to reaching a maximum of 99% duty cycle in a PWM controller. Since the boost response is slow, the output voltage sags because the PFC output voltage droops.

Another known method of increasing efficiency typically involves employing a separate optocoupler circuit to transmit output load current information to a PFC controller to adjust the PFC output voltage during load transients or use a faster communication port to transfer data between primary and secondary digital signal processors (DSPs). Still another known method uses a current sense transformer on a primary side of the LLC converter. Such known methods typically require additional, costly components, which often lack the response time necessary for LLC converter operation.

BRIEF DESCRIPTION

In one embodiment, a method is provided for improving load transient response in LLC converters. The method includes coupling a current sensing circuit to an output of the LLC converter, sensing load current of the LLC converter, and increasing a setpoint voltage for a power factor correction (PFC) circuit output based on the sensed load current.

In another embodiment, an inductor-inductor-capacitor (LLC) converter is provided that includes a power factor correction (PFC) circuit, a current sensing circuit, and a boost controller coupled to the current sensing circuit. The current sensing circuit is configured to sense load current of the LLC converter. The boost controller is coupled to the current sensing circuit and is configured to activate a PFC circuit switch to increase a setpoint voltage for the PFC circuit output.

In yet another embodiment, an alternating current (AC) to direct current (DC) converter is provided that includes a rectifier, a PFC circuit coupled to the rectifier, and an inductor-inductor-capacitor (LLC) converter coupled to the PFC circuit. The LLC converter includes a current sensing circuit configured to sense load current of the LLC converter, and a boost controller coupled to the current sensing circuit. The boost controller is configured to activate a PFC circuit switch to increase a setpoint voltage for the PFC circuit output.

DETAILED DESCRIPTION

Figure 1:
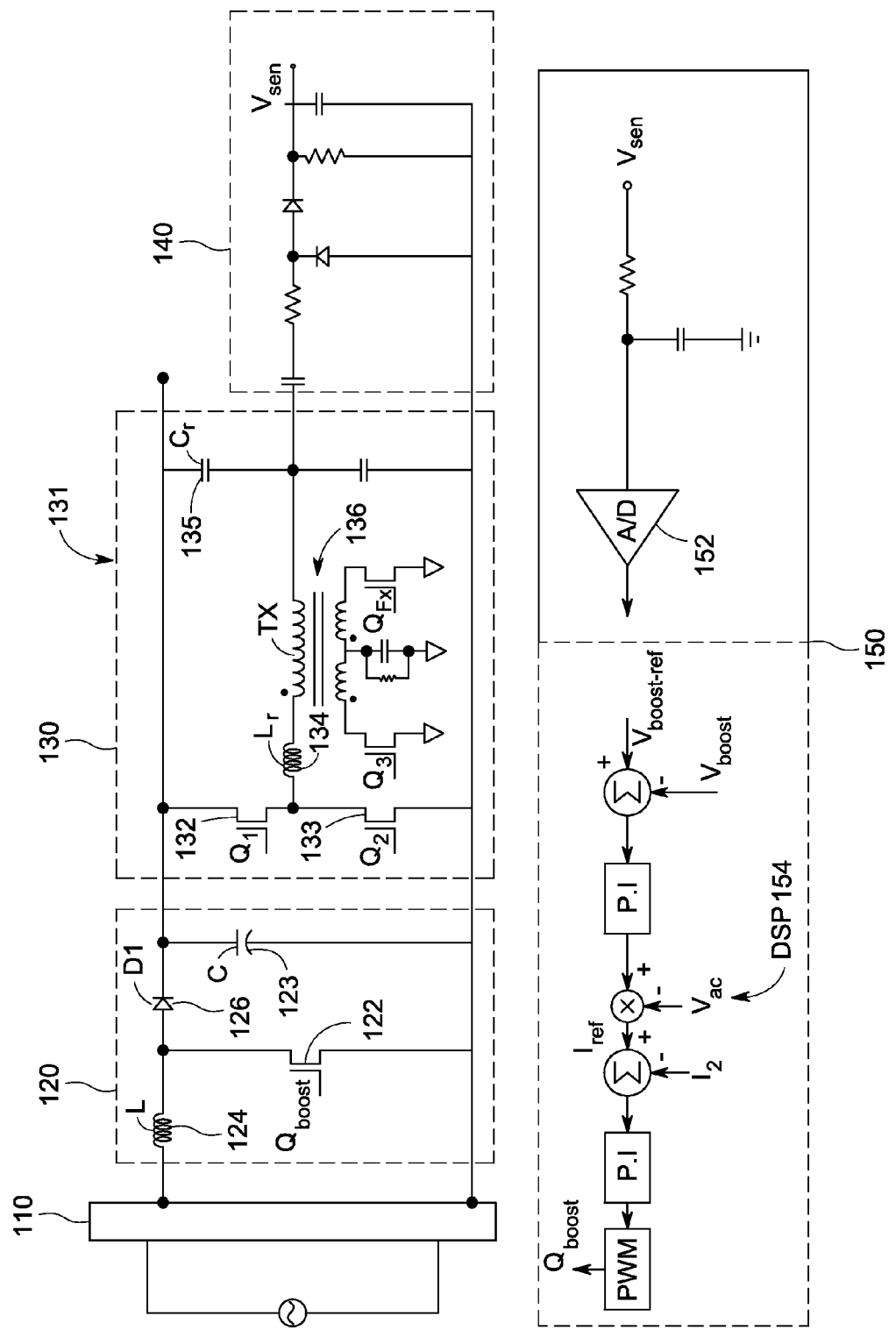
FIG. 1 is a block diagram of an embodiment of an alternating current (AC) to direct current (DC) converter.

FIG. 1 is a block diagram of an embodiment of an alternating current (AC) to direct current (DC) converter 100. In an exemplary embodiment, AC to DC converter 100 includes a rectifier 110, a power factor correction (PFC) circuit 120 and a DC/DC converter 130.

In an exemplary embodiment, rectifier 110 is configured to receive an AC input and generate a DC output. The AC input may be from a conventional power supply such as a wall outlet or any other power supply that enables rectifier 110 to function as described herein. Rectifier 110 may be a conventional rectifier. In an exemplary embodiment, rectifier 110 is a full bridge rectifier. In an alternative embodiment, rectifier 110 may be a half-bridge rectifier.

In an exemplary embodiment, PFC circuit 120 is configured to receive and condition the DC output generated by the rectifier 110. PFC circuit 120 includes an input inductor 124 (L), an output diode 126 (D1), and an output capacitor 128 (C). In one embodiment, PFC circuit 120 boosts the DC output from rectifier 110. PFC circuit 120 is configured to employ a main power switch 122 ($Q_{boost}$) to boost the DC input voltage and generate a DC output voltage.

DC/DC converter 130 receives the conditioned DC output from PFC circuit 120 and converts it to a different DC voltage to provide a DC converter output. DC/DC converter 130 may be a conventional DC/DC converter. In an exemplary embodiment, DC/DC converter 130 is a resonant converter such as, for example, an LLC converter 131. LLC converter 131 may be a single stage or may be a multiple stage converter. LLC converter 131 includes LLC MOSFETs ($Q_1$) 132 and ($Q_2$) 133, a resonant inductor ($L_r$) 134, a resonant capacitor ($C_r$) 135, and a transformer (TX) 136.

In an exemplary embodiment, AC to DC converter 100 also includes a current sensing circuit ($V_{sen}$) 140. Current sensing circuit 140 indirectly senses load current across resonant capacitor 135 on a primary side of transformer 136. Load current is used to obtain a higher setpoint voltage for an output of PFC circuit 120. Current sensing circuit 140 is positioned such that it does not cross the isolation boundary, resulting in lower cost and system complexity. In response to a change in the load, current sensing circuit 140 automatically responds by transmitting sensed current to a boost controller 150 before a change in output power of converter 100 occurs.

In an exemplary embodiment, boost controller 150 includes an analog-to-digital (A/D) converter 152 or a level detector (not shown) that senses voltage on the primary side of LLC converter 130 and uses step change information to raise the boost voltage. Boost controller 150 also includes a digital signal processor (DSP) 154 coupled to an output of A/D converter 152. DSP 154 operates as a typical pulse width modulator (PWM). DSP 154 is configured to generate control signals to activate (i.e., turn-on) and deactivate (i.e., turn-off) main switch 122. DSP 154 also activates switch 122 to generate a higher setpoint voltage for PFC circuit 120.

Figure 2:
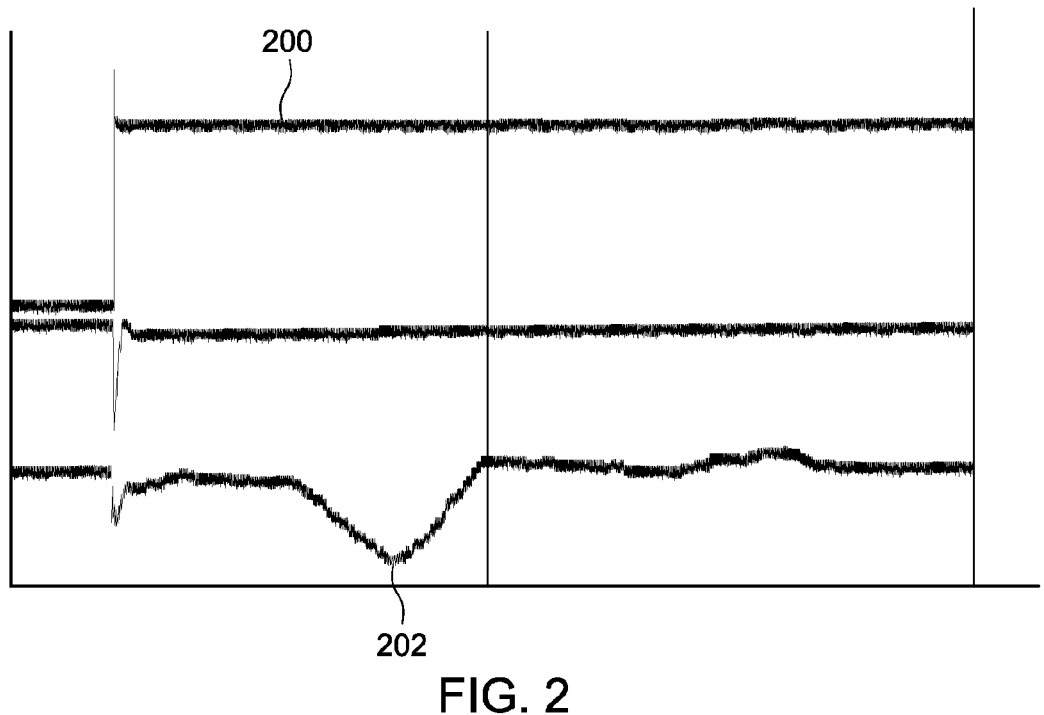
FIG. 2 is a graph showing deviations in output current during an output load change in a known LLC converter.
Figure 3:
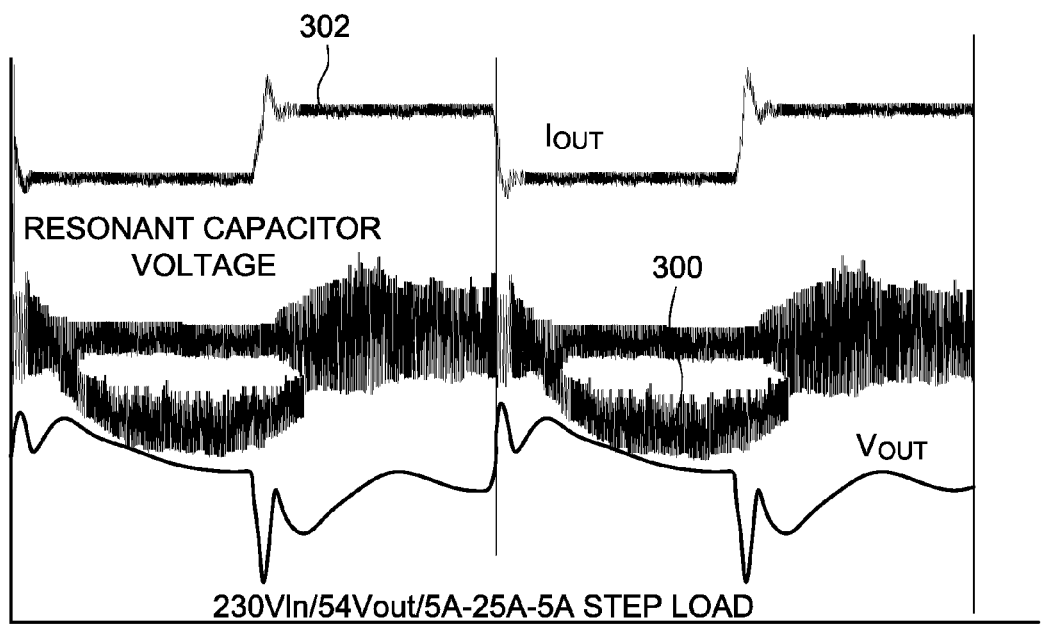
FIG. 3 is a graph showing deviations in output current in an LLC converter having a current sensing circuit and a boost controller, as shown in FIG. 1.

FIG. 2 is a graph showing deviations in output current during an output load change in a known LLC converter. FIG. 3 is a graph showing deviations in output current in an LLC converter having current sensing circuit 140 and boost controller 150 (shown in FIG. 1).

Referring to FIG. 2, when a change in the output load occurs, a large deviation occurs in output current 200. In the exemplary embodiment, output current deviates from 2.5 A to 27.5 A at the converter's recovery time of 1 millisecond. At about 4 milliseconds, a lag in boost response occurs, resulting in a 400V boost ripple 202 in the output voltage of the converter.

Referring to FIG. 3, current sensing circuit 140 operates as a transient tracker 300 of the output current 302 of LLC converter 130. As the output current deviates, transient tracker 300 tracks the deviations and takes action based on the tracking information. This includes feeding the sensed change in current to boost controller 150. Knowledge by current sensing circuit 140 that the load is transitioning enables the boost response to begin activating PFC circuit 110 before output voltage begins to sag.

The embodiments described herein facilitate improving load transient response time for LLC DC/DC converters with PFC correction circuits. By indirectly sensing load current across a resonant capacitor using a current sensing circuit and transmitting a current signal to a DSP, the signal does not have to cross an isolation boundary of the transformer, resulting in a faster response time. Indirectly sensing the load current eliminates the need for a current sensing transformer on the primary side of the LLC converter, which leads to reduced size and cost of components and operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of improving load transient response in an inductor-inductor-capacitor (LLC) converter, said method comprising:
providing a transformer that includes a primary side for receiving voltage output by a power factor correction (PFC) circuit, a secondary side for generating output voltage, and an isolation barrier that isolates the primary and secondary sides, the primary side including a resonant capacitor coupled thereto;
coupling a current sensing circuit to the resonant capacitor on the primary side of the LLC converter;
indirectly sensing, by the current sensing circuit, load current across the resonant capacitor on the primary side of the LLC converter;
automatically transmitting, by the current sensing circuit, the sensed load current to a boost controller before output voltage of the LLC converter begins to sag upon sensing a change in the load current; and
increasing, by the boost controller, a setpoint voltage for the PFC circuit output based solely on the indirectly sensed load current to operate the LLC converter at approximately a resonant frequency of the LLC converter.

2. The method according to claim 1, wherein the LLC converter includes a boost controller, said method further comprises feeding the sensed current to the boost controller.

3. The method according to claim 2, further comprising feeding the sensed current as an analog signal to an analog-to-digital (A/D) converter of the boost controller.

4. The method according to claim 3, further comprising:
converting the analog signal to a digital signal; and
transmitting the digital signal to a digital signal processor (DSP) of the boost controller.

5. The method according to claim 4, further comprising pulse width modulating the digital signal to activate a switch associated with the PFC circuit.

6. The method according to claim 1, further comprising automatically responding, by the current sensing circuit, to a change in load current before output voltage of the LLC converter begins to sag.

7. An inductor-inductor-capacitor (LLC) converter comprising:
a power factor correction (PFC) circuit;
a transformer coupled downstream from said PFC circuit, said transformer comprising a primary side for receiving voltage output by said PFC circuit, a secondary side for generating output voltage, and an isolation barrier that isolates the primary and secondary sides, the primary side including a resonant capacitor coupled thereto;
a current sensing circuit configured to:
indirectly sense load current across said resonant capacitor on the primary side of said LLC converter; and
automatically transmit the sensed load current to a boost controller before output voltage of the LLC converter begins to sag upon sensing a change in the load current; and
a boost controller coupled to said current sensing circuit on the primary side, said boost controller configured to activate a PFC circuit switch to increase a setpoint voltage for said PFC circuit output based solely on the indirectly sensed load current to operate said LLC converter at approximately a resonant frequency of said LLC converter.

8. The converter according to claim 7, wherein said boost controller comprises an analog-to-digital (A/D) converter configured to receive an analog signal from said current sensing circuit.

9. The converter according to claim 8, wherein said A/D converter is further configured to:
convert the analog signal to a digital signal; and
transmit the digital signal to a digital signal processor (DSP) of said boost controller.

10. The converter according to claim 9, wherein said DSP comprises a pulse width modulator configured to activate said PFC circuit switch.

11. The converter according to claim 7, wherein said current sensing circuit is configured to automatically respond to a change in load current before output voltage of the LLC converter begins to sag.

12. An alternating current (AC) to direct current (DC) converter comprising:
a rectifier;
a power factor correction (PFC) circuit coupled to said rectifier; and
an inductor-inductor-capacitor (LLC) converter coupled to said PFC circuit, said LLC converter comprising:
a transformer coupled downstream from said PFC circuit, said transformer comprising a primary side for receiving voltage output by said PFC circuit, a secondary side for generating output voltage, and an isolation barrier that isolates the primary and secondary sides, the primary side including a resonant capacitor coupled thereto;

a current sensing circuit configured to:
  indirectly sense load current across said resonant capacitor on the primary side of said LLC converter; and
  automatically transmit the sensed load current to a boost controller before output voltage of the LLC converter begins to sag upon sensing a change in the load current; and a boost controller coupled to said current sensing circuit on the primary side, said boost controller configured to activate a PFC circuit switch to increase a setpoint voltage for said PFC circuit output based solely on the indirectly sensed load current to operate said LLC converter at approximately a resonant frequency of said LLC converter.

13. The converter according to claim 12, wherein said boost controller comprises an analog-to-digital (A/D) converter configured to receive an analog signal from said current sensing circuit.

14. The converter according to claim 12, wherein said current sensing circuit is configured to automatically respond to a change in load current before output voltage of the LLC converter begins to sag.

* * * * *